Nov. 17, 1942.  V. L. HUBBARD  2,302,323
ICE CREAM PIE CUTTER
Filed Jan. 17, 1942  2 Sheets-Sheet 2
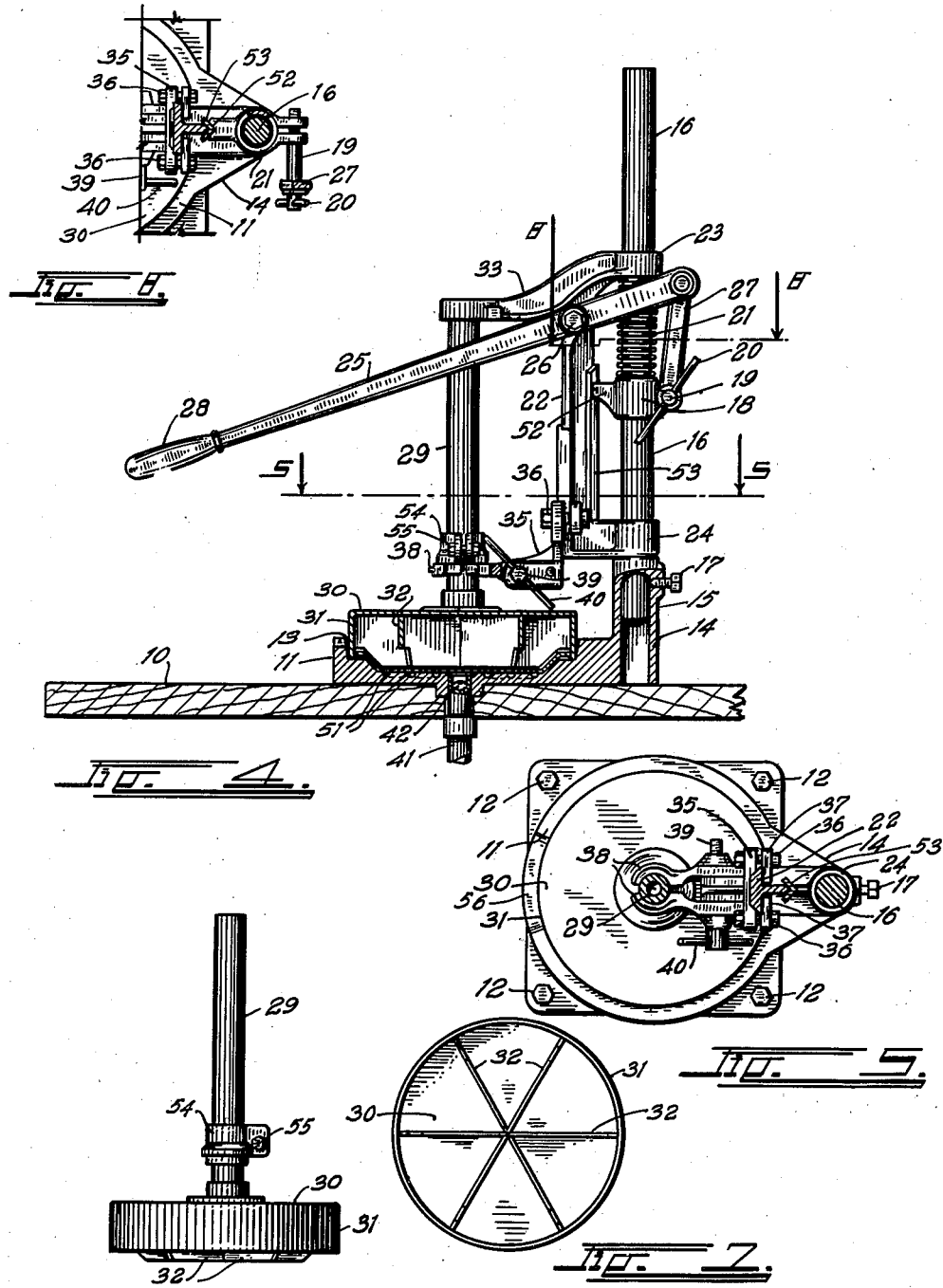
INVENTOR.
VERNON L. HUBBARD.
BY
ATTORNEY.

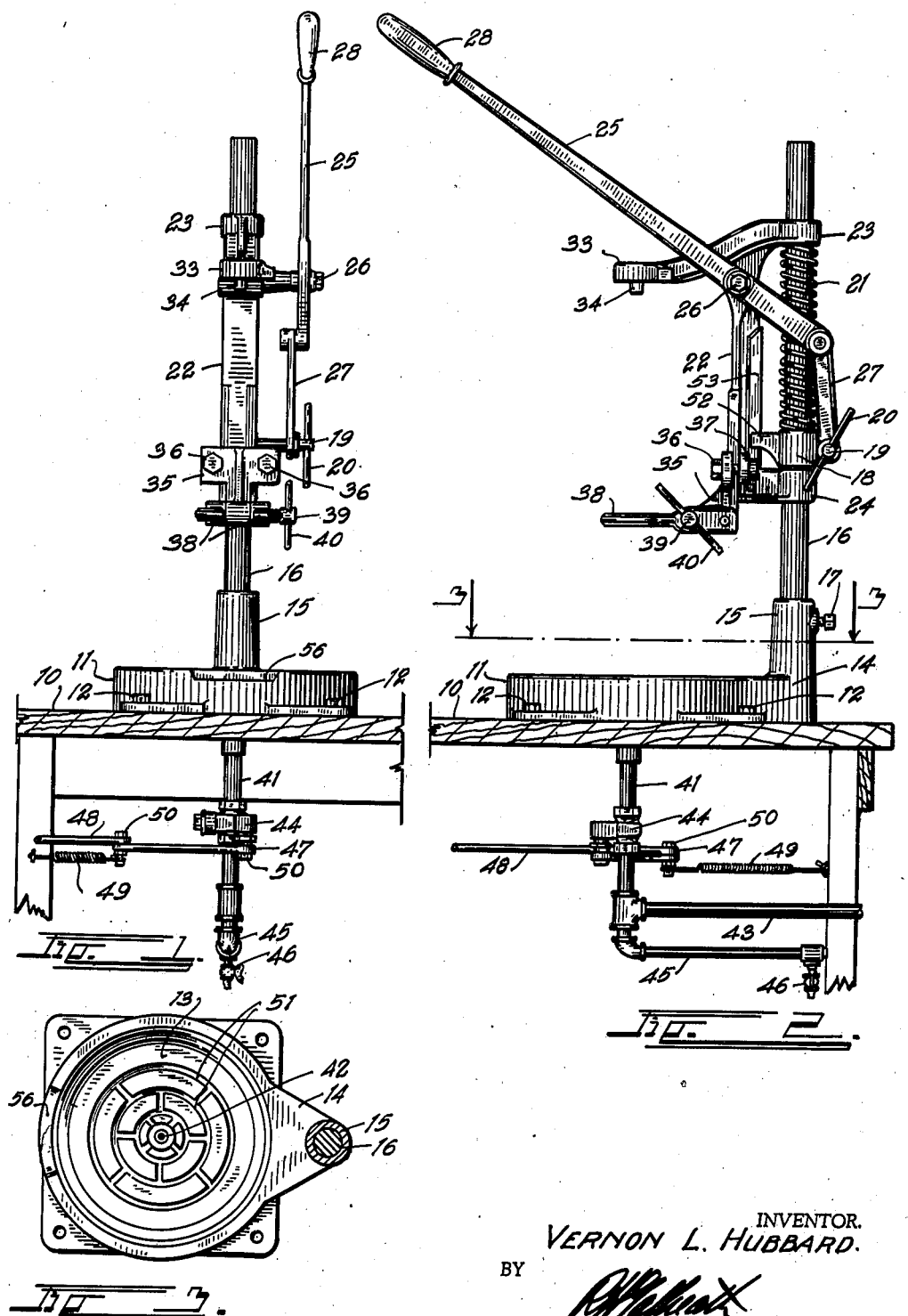

Patented Nov. 17, 1942

2,302,323

UNITED STATES PATENT OFFICE 2,302,323

ICE CREAM PIE CUTTER

Vernon Layton Hubbard, Denver, Colo.

Application January 17, 1942, Serial No. 427,151

5 Claims. (Cl. 107—21)

This invention relates to a device for cutting what are known as ice cream pies. These pies are formed in the shape of an ordinary baked pie from layers and intermixtures of various ice creams. They are frozen in paper pie plates similar to the usual pie and when frozen are extremely hard to cut and if allowed to soften sufficiently to allow easy cutting, the firmness and desirability of the pie is destroyed.

This invention relates to a cutting device for such pies and is designed for use at the creamery or manufacturing plant where the pies are made so as to furnish the latter in either pre-cut or easily-cut condition to the customer.

The principal object of the invention is to provide a device for this purpose which can be rapidly and efficiently operated to cut the pies into a predetermined number of slices regardless of their frozen condition; which will automatically clean itself after each cutting; which will be quickly adjustable for various numbers of slices; and which will loosen the pie from its plate.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a front view of the improved ice cream pie cutter with the pie cutting member removed therefrom;

Fig. 2 is a side view of the mechanism of Fig. 1;

Fig. 3 is a horizontal section looking downwardly, taken on the line 3—3, Fig. 2;

Fig. 4 is a side view partly in section, illustrating the device in the closed or cutting position with the cutting device in place;

Fig. 5 is a horizontal section, taken on the line 5—5, Fig. 4;

Figs. 6 and 7 are side and bottom views, respectively, of the cutting member; and Fig. 8 is a horizontal section, taken on line 8—8 of Fig. 4.

The invention is designed for installation and use on a bench or table such as indicated at 10 and comprises a base member 11 which is bolted to the table by means of suitable bolts or cap screws 12. The base is formed with a pan socket 13 of a size to receive a typical pie pan. A bracket 14 projects from the side of the pan socket to support a vertical post sleeve 15. The post sleeve 15 in turn supports a vertical post 16 which is locked in the former by means of a suitable set screw 17. A split clamping collar 18 is clamped tightly about the post 16 at any desired height thereon by means of a clamp screw 19 having convenient handles 20.

The clamping sleeve supports, through the medium of a compression spring 21, a vertically movable yoke 22. The yoke is provided with an upper sleeve 23 and a lower sleeve 24, both of which slidably engage the post 16 above and below the collar 18. The spring 21 is compressed between the upper sleeve 23 and the collar 18. The yoke is prevented from rotating around the post by means of a forked lug 52 which extends forwardly from the collar 18 to slidably engage a vertical, V-guide surface 53 on the back of the yoke. Thus, after the collar 18 has been set in position it maintains the yoke accurately placed.

The yoke is moved upwardly and downwardly through the medium of a press lever 25 which is pivoted on a pivot screw 26 in the yoke 22. The shorter extremity of the lever 25 is hingedly connected to a link 27 extending from the clamp screw 19. The longer extremity of the lever 25 terminates in a suitable hand grip 28.

It can be readily seen that movement of the lever 25 upwardly and downwardly will impart a multiplied pressure movement to move the yoke along the post 16. The spring 21 constantly urges and supports the yoke at its uppermost position.

The yoke is designed to support a pie cutting device such as illustrated in Figs. 6 and 7. The pie cutting device comprises a hollow shank 29 secured to a disc 30 which is surrounded by a downwardly depending flange 31. A plurality of cutting blades 32 extend radially inward from the flange 31 and project therebelow. The flange 31 and the blades 32 conform in size and contour to the pan socket 13 so that they may contact the inner surfaces thereof. The shank 29 carries an adjustable flanged collar 54 which can be clamped at any desired height therein by means of a clamp screw 55.

The yoke is provided with a forwardly extending, upper arm 33 having a downwardly extending centering pin 34 which enters the upper extremity of the hollow shank 29. An L-shaped clamp bracket 35 may be secured at any desired vertical position on the yoke 22 by means of clamp screws 36 which act to draw a pair of clamping dogs 37 against the back of the yoke 22. The bracket 35 carries a coacting pair of vise jaws 38 which may be drawn together by means of a suitable vise screw 39 having hand engaging wings 40.

The method of attaching the cutting device is believed to be readily apparent from the drawings. The hollow shank 29 of the cutter is simply slipped over the centering pin 34 and the flanged collar 54 is swung between the vise jaws 38 with its flange resting thereon. The screw 39 is then tightened and the cutting device is locked accurately and securely in place.

It can be readily seen that if a pie, on its pan, is placed in the pan socket and the press lever is pulled downwardly the pie will be cut into as many pieces as there are cutting blades in the cutter. If the pie is frozen solid, however, it is not possible, by hand, to force the blades into the pie. This obstacle, however, is overcome by means of the following construction.

A steam jet pipe 41 is tapped concentrically through the bottom of the pan socket 13. A narrowed orifice or steam jet nozzle 42 is secured on the pipe extremity. Steam is supplied to the steam jet pipe through a steam feed pipe 43 and the flow is controlled by means of a quick-opening throttle valve 44. A condensate trap 45 collects any water formed in the piping and the latter may be drained away through a drip cock 46.

The throttle valve 44 is provided with a valve handle 47, to the extremity of which, a knee contact lever 48 is adjustably attached. A tension spring 49 acts upon the valve handle 47 to constantly urge the valve to the closed position. When installed, the lever 48 is adjusted on the handle 47 so as to position the former at a convenient position to be actuated by the operator's knee. A connecting bolt 50 is then tightened to lock the two levers together.

After each pie is removed from the pan socket, the operator strikes the lever 48 with the knee to cause a jet of steam to be projected into the bottom of the cutter. This accomplishes a double purpose; first, it cleanses the cutter and blows away any accumulated material thereon; second, it warms the cutter knives so that when they descend upon the next pie they will have no difficulty in melting their way therethrough.

It is, of course, also desirable to loosen the pie from its pan. This is accomplished by means of the cutter flange 31, which enters the pie around its periphery and separates it from the edge of the pan, and by means of steam grooves 51 formed in the bottom of the pan socket which communicate with the steam jet. While the pressure of the cutter is on the pan the operator can allow a limited amount of steam to flow into the steam grooves 51 to warm the pan and loosen the pie therefrom. A notch 56 is formed in the rim of the pan socket to allow easy removal of the pan.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An ice cream pie cutter comprising: a base member; a pan socket in said base member; a post extending upwardly from said base member; a yoke member slidable on said post; a lever for raising and lowering said yoke; a cutter disc; a cutter flange extending downwardly about the periphery of said disc; a plurality of cutter knives extending radially inward from said flange; a shank projecting axially upward from said disc; an arm projecting forwardly from said yoke; means on said arm for engaging the upper extremity of said shank; and a clamping vise on said yoke below said arm for securing said shank to said yoke.

2. An ice cream pie cutter comprising: a base member; a pan socket in said base member; a post extending upwardly from said base member; a yoke member slidable on said post; a lever for raising and lowering said yoke; a cutter disc; a cutter flange extending downwardly about the periphery of said disc; a plurality of cutter knives extending radially inward from said flange; a shank projecting axially upward from said disc; an arm projecting forwardly from said yoke; means on said arm for engaging the upper extremity of said shank; a clamping vise on said yoke below said arm for securing said shank to said yoke; and means for varying the height of said clamping device on said yoke as desired.

3. In a cutter of the class described, having a base, a standard rising from said base and a yoke vertically movable on said standard, means for securing a cutter to said yoke comprising: an elongated shank extending upwardly from said cutter; an upper arm on said yoke engaging the upper extremity of said shank; and vise jaws on said yoke for gripping the lower portion of said shank.

4. In a cutter of the class described, having a base, a standard rising from said base and a yoke vertically movable on said standard, means for securing a cutter to said yoke comprising: an elongated shank extending upwardly from said cutter; an upper arm on said yoke engaging the upper extremity of said shank; vise jaws on said yoke for gripping the lower portion of said shank; and means adjustably securing said jaws to said yoke so that the vertical position of the jaws may be varied.

5. In a cutter of the class described, having a base, a standard rising from said base and a yoke vertically movable on said standard, means for securing a cutter to said yoke comprising: an elongated shank extending upwardly from said cutter; an upper arm on said yoke engaging the upper extremity of said shank; vise jaws on said yoke for gripping the lower portion of said shank; means adjustably securing said jaws to said yoke so that the vertical position of the jaws may be varied; and means on said shank for preventing the latter from passing downwardly through said jaws.

VERNON LAYTON HUBBARD.